United States Patent [19]

Fujimoto et al.

[11] Patent Number: 5,539,539
[45] Date of Patent: Jul. 23, 1996

[54] COLOR CONVERTING CIRCUIT FOR USE IN AN IMAGE FORMING APPARATUS

[75] Inventors: Masaya Fujimoto; Katsumi Amakawa; Ryuichi Okumura; Haruo Yamamoto; Toshio Watanabe, all of Osaka, Japan

[73] Assignee: Mita Industrial Co., Ltd., Osaka, Japan

[21] Appl. No.: 26,591

[22] Filed: Mar. 5, 1993

[30] Foreign Application Priority Data

Mar. 12, 1992 [JP] Japan ................................ 4-053588
Mar. 12, 1992 [JP] Japan ................................ 4-053590
Jul. 8, 1992 [JP] Japan ................................ 4-180631

[51] Int. Cl.⁶ ................................................ G03F 3/08
[52] U.S. Cl. ........................... 358/518; 358/522; 347/232
[58] Field of Search ................................ 355/245, 246, 355/326, 88; 346/108; 358/518, 522; 347/232

[56] References Cited

U.S. PATENT DOCUMENTS

| 5,138,443 | 8/1992 | Ikeda et al. | 358/518 |
| 5,177,602 | 1/1993 | Fujimori | 358/518 |
| 5,307,182 | 4/1994 | Maltz | 358/522 |

FOREIGN PATENT DOCUMENTS

| 269334 | 6/1988 | European Pat. Off. . |
| 369720 | 5/1990 | European Pat. Off. . |
| 60-98764 | 6/1985 | Japan . |
| 02118680 | 5/1990 | Japan . |

OTHER PUBLICATIONS

Hung, Po–Chieh, "Colorometric Calibration for Scanners and Media", Feb. 1991, a report from Konica Corporation.

*Primary Examiner*—Huan H. Tran
*Assistant Examiner*—Raquel Yvette Gordon
*Attorney, Agent, or Firm*—Beveridge, DeGrandi, Weilacher & Young

[57] ABSTRACT

The average value of each of yellow, magenta and cyan color image data of a color-to-be-converted which data are obtained at the time of pre-scanning of a copying machine and stored in memories, respectively, is calculated, and then, predetermined set values are respectively added to and subtracted from the calculated average values of yellow, magenta and cyan to obtain upper and lower limit values of the conversion range. When the lower limit value obtained by subtraction is below a predetermined lower limit restriction value, the lower limit restriction value is set as the lower limit value of the conversion range. With this feature, when an extremely pale color is specified as a color-to-be-converted in a region other than a background portion of a color original where no letters, etc. are printed, the color of the background portion is not converted together with the specified color.

21 Claims, 12 Drawing Sheets

COLOR CONVERTING CIRCUIT FOR USE IN AN IMAGE FORMING APPARATUS

BACKGROUND OF THE INVENTION

1. Field of the Invention

The present invention relates to a color converting circuit for use in an image forming apparatus such as an electrophotographic copying machine.

2. Description of the Prior Art

Conventionally, some image forming apparatuses such as digital electrophotographic copying machines have been provided with a color converting function to copy a color original while converting a color on the original, which color is specified by the user (this color will hereinafter be referred to as color-to-be-converted), to another color desired by the user (this color will hereinafter be referred to as conversion color). Specifically, in executing predetermined signal processing at an image processing circuit portion with respect to each of yellow, magenta and cyan color image data which are read out by a color scanner from a color original to be copied, color image data of a color-to-be-converted which are among color image data to be inputted, are respectively converted to color image data of a conversion color at a color converting circuit provided in the image processing circuit portion, and thereafter, the converted data are outputted to a succeeding laser scanner unit for forming a latent image. A color image where color conversion has been made is thus formed.

In converting color image data at the color converting circuit in the above-described manner, it has been considered to perform the conversion with a predetermined latitude (i.e. conversion range) so that nonuniformity of each color image data of a color-to-be-converted due to nonuniformity of the reading out by the color scanner and color nonuniformity on the original can be coped with, that is, so that a specified color conversion processing is executed without failure.

With such a conversion method, however, when a color of an extremely low density, that is, a color of a density close to that of the color of the background portion of the original where no letters, figures, etc. are printed (this color of the background portion will hereinafter be referred to as paper color) is specified from among the colors on the original, due to a certain conversion range, the paper color of the original may be erroneously converted together with the specified color. For example, when pale pink having a density close to that of the paper color (generally, white or pale grey) of the original is specified as the color-to-be-converted, depending on the setting of the conversion range, the paper color of the original may be converted together with pink.

Moreover, in the above-described conventional color converting circuit, since a conversion range is not set which is in accordance with a density characteristic of each of the color image data to be input, depending on whether the color-to-be-converted is a color of low density or a color of high density, erroneous conversion may be caused or some portions may not be converted at all.

Further, in the conventional color converting circuit, since a conversion range is not set which is in accordance with an image quality mode (in this case, copy mode) of the copying machine which mode the user arbitrary selects according to the original, depending on whether the image quality mode is a letter mode or a photograph mode, erroneous conversion may be caused or some portions may not be converted at all.

Specifically, in the case of the letter mode, since it is a copy mode for more excellently reproducing a multi-color original (e.g. a color graph using primary colors) for use in offices which original has only a little half tone and, in the case of monochrome originals, an original having a sharp contrast, that is, since it is a mode for copying an original having no half-tone-level density, no problems arise even if the conversion range is set to be relatively large so that no unconverted portions are produced. In the case of photograph mode, however, since it is a copy mode for more excellently reproducing an original (e.g. photograph) having a large amount of half tone, if the conversion range is set to be too large, a color other than the specified color may be erroneously converted.

SUMMARY OF THE INVENTION

An object of the present invention is to provide a color converting circuit where, when an extremely pale color is specified as a color-to-be-converted in a region other than the portion of a paper color of an original, the paper color is not converted together with the specified color, and when color conversion of the paper color of the original is specified, the color conversion of the paper color is made without failure.

Another object of the present invention is to provide a color converting circuit with which color conversion processing can always be excellently executed irrespective of whether a color-to-be-converted on an original is a color of low density or a color of high density.

Still another object of the present invention is to provide color converting circuit with which a color converting processing which is optimum for an image quality mode can be executed.

According to one feature of the present invention, a color converting circuit is provided with: conversion range setting means for determining a conversion range representative of a color-to-be-converted; conversion color setting means for setting a conversion color; discriminating means for discriminating whether or not input image data are present within said conversion range; and a selector for outputting the inputted image data or outputting data on the set conversion color according to a result of the discrimination by the discriminating means, wherein said conversion range setting means includes restricting means for restricting, in setting the conversion range, so that the conversion range does not exceed a predetermined value.

According to another feature of the present invention, a color converting circuit is provided with: conversion range setting means for determining a conversion range representative of a color-to-be-converted according to a density characteristic of input image data; conversion color setting means for setting a conversion color; discriminating means for discriminating whether or not image data input after the conversion range has been set are present within said conversion range; and a selector for outputting the input image data or outputting data on the set conversion color according to a result of the discrimination by the discriminating means.

According to a further feature of the present invention, a color converting circuit is provided with: image quality mode selecting means for selecting between a letter image forming mode and a photograph image forming mode and setting a selected mode; conversion range setting means for setting a conversion range representative of a color-to-be-converted according to the image quality mode; conversion color setting means for setting a conversion color; discriminating means for discriminating whether or not image data input after the conversion range has been set are present within said conversion range; and a selector for outputting the input image data or outputting data on the set conversion color according to a result of the discrimination by the discriminating means.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
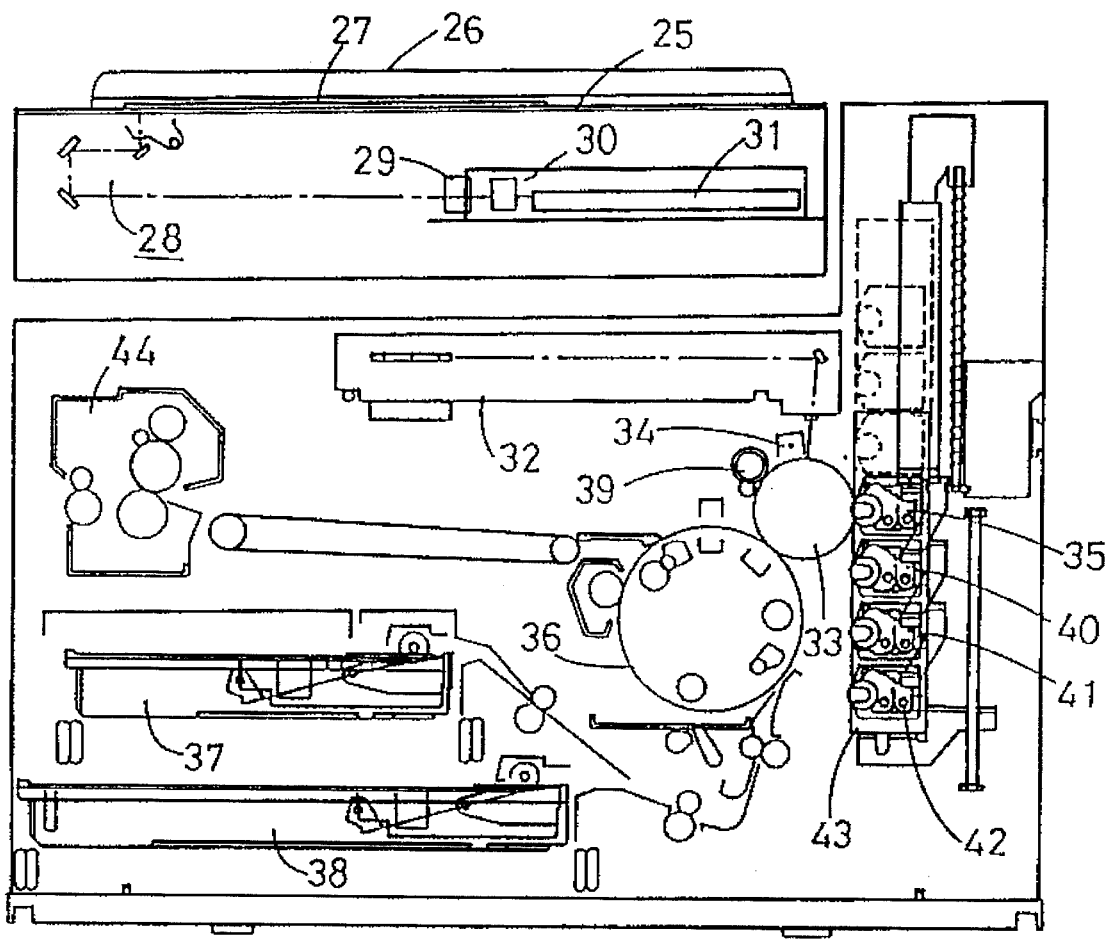
FIG. 1 is a schematic view of a digital color electrophotographic copying machine embodying the present invention.

Color converting circuits for use in a digital color electrophotographic copying machine will hereinafter be described as embodiments of the present invention with reference to the drawings. FIG. 1 is a schematic view of a digital color electrophotographic copying machine provided with a color converting function.

A color original 27 placed on a contact glass 25 while being pressed by an original cover 26 is copy-scanned after prescanned by a scanning optical system 28 constituting a color scanner portion. Image information thereof is directed from a condenser lens 29 to a color image signal generator 30 through light serving as a medium. At the color image signal generator 30, the image information is converted from light signals to electric signals and converted from signals representative of the three primary colors of light to signals representative of the three primary color of toner, i.e. yellow, magenta and cyan color image data Y, M and C. Then, at an image processing circuit 31 including a color converting circuit, signal processing, such as the color conversion and the generation of black color image data, required for image processing is executed. Thereafter, a latent image is formed on a photoreceptor drum 33 by a laser scanner unit 32. Prior to the formation of the latent image, the surface of the photoreceptor drum 33 is charged by a main charger 34.

In a case where a color image is formed, first, a latent image is formed on the photoreceptor drum 33 by means of a laser beam based on yellow color image data with respect to which signal processing such as the color conversion has been performed, and the latent image is developed by a Y developer unit 35. The Y developer unit 35 contains yellow toner and develops the latent image on the photoreceptor drum 33 with the yellow toner. Then, the image on the photoreceptor drum 33 developed with the yellow toner is transferred onto a sheet of paper arranged to wind around a transferring drum 36. The sheet is supplied by way of a paper feeding path from a paper feeding cassette 37 or 38.

The sheet remains on the surface of the transferring drum 36, and an image of another color is transferred thereonto. That is, residual toner and charge on the photoreceptor drum 33 are removed by a cleaning unit 39 and a discharging unit (not shown), respectively, and thereafter, the photoreceptor drum 33 is charged again by the main charger 34. Then, a latent image corresponding to a magenta image formed on the photoreceptor drum 33 by means of a laser beam for forming a latent image based on the magenta color image data with respect to which signal processing such as the color conversion has been performed is developed by an M developer unit 40. At this time, the M developer unit 40 is brought to a position opposite to the photoreceptor drum 33 in place of the Y developer unit 35, and develops the latent image with magenta toner.

In this embodiment, as shown in the figure, the Y developer unit 35 for development of yellow images, the M developer unit 40 for development of magenta images, a C developer unit 41 for development of cyan images and a BK developer unit 42 for development of black images are subsequently attached in a vertical direction onto a moving body 43 which vertically moves. These developer units are alternatively brought to a development position (the position opposite to the photoreceptor drum 33) in correspondence with the color image data used for forming a latent image by means of a laser beam.

The image on the photoreceptor drum 33 developed with the magenta toner is transferred onto the sheet of paper (the sheet of paper on which the yellow image has been transferred) on the transferring drum 36. A cyan and a black image are further transferred onto the sheet in a similar manner. A color image with respect to which the color conversion processing has been executed is thus formed. Thereafter, the sheet on which the color image has been formed is separated from the transferring drum 36, and after the image is fixed by a fixing portion 44, the sheet is discharged from the electrophotographic copying machine.

Figure 2:
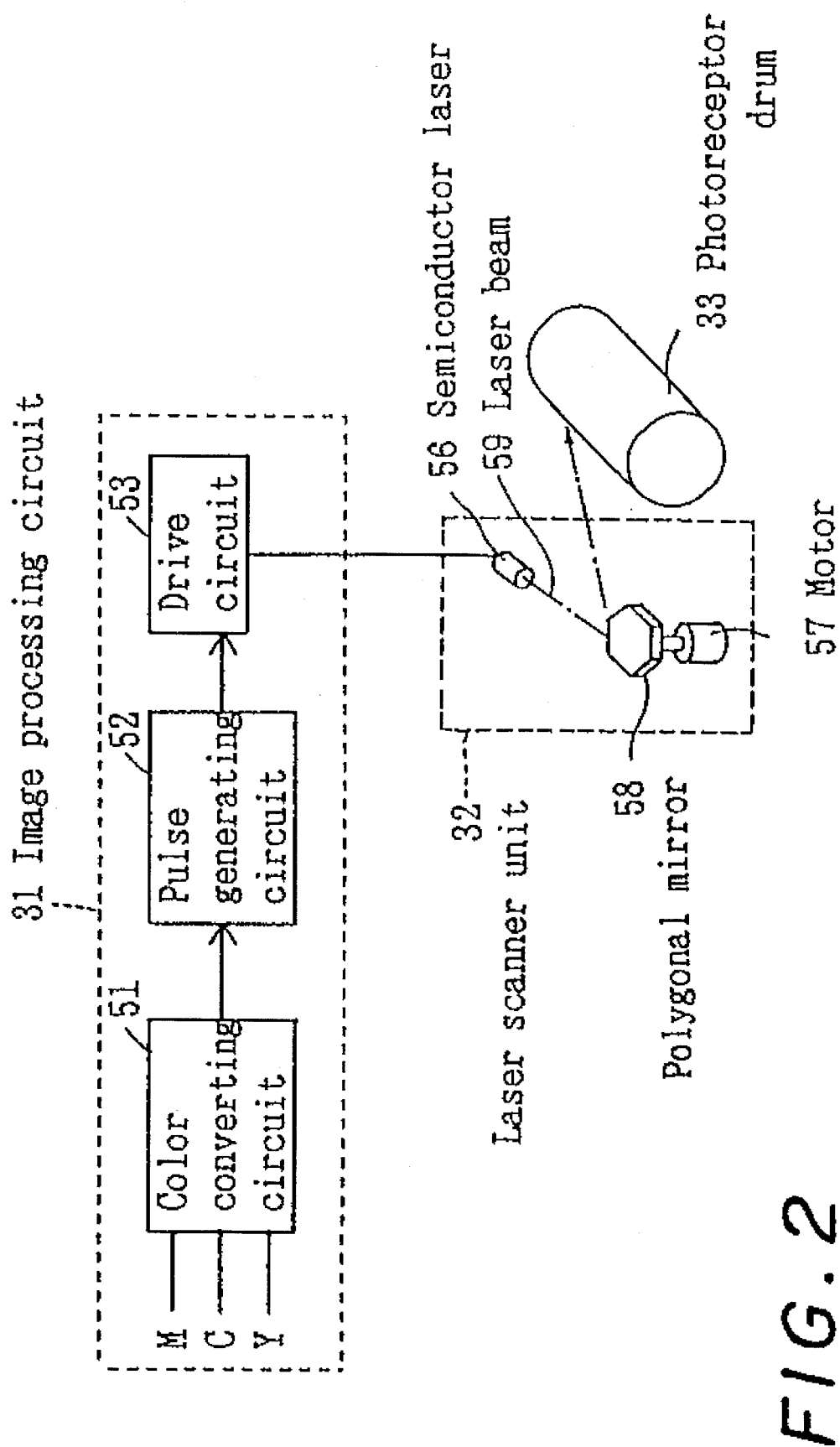
FIG. 2 is a view showing an image processing circuit and an image forming portion of the copying machine of FIG. 1.

FIG. 2 shows a relationship between principal portions of the image processing circuit 31 and a laser scanner unit 32. In the image processing circuit 31, the color image data Y, M and C supplied from the color image signal generator 30 are color-converted at a color converting circuit 51, a pulse generating circuit 52 outputs a pulse of a width corresponding to the values of the color image data based on the color image data outputted by the color converting circuit 51, and by the pulse, a semiconductor laser 56 of the laser scanner unit 32 is activated through a drive circuit 53 to emit a laser beam 59. The laser beam 59 scans the surface of the photoreceptor drum 33 by means of a polygonal mirror 58 rotated by a motor 57 to form a latent image on the surface of the photoreceptor drum 33.

Figure 3:
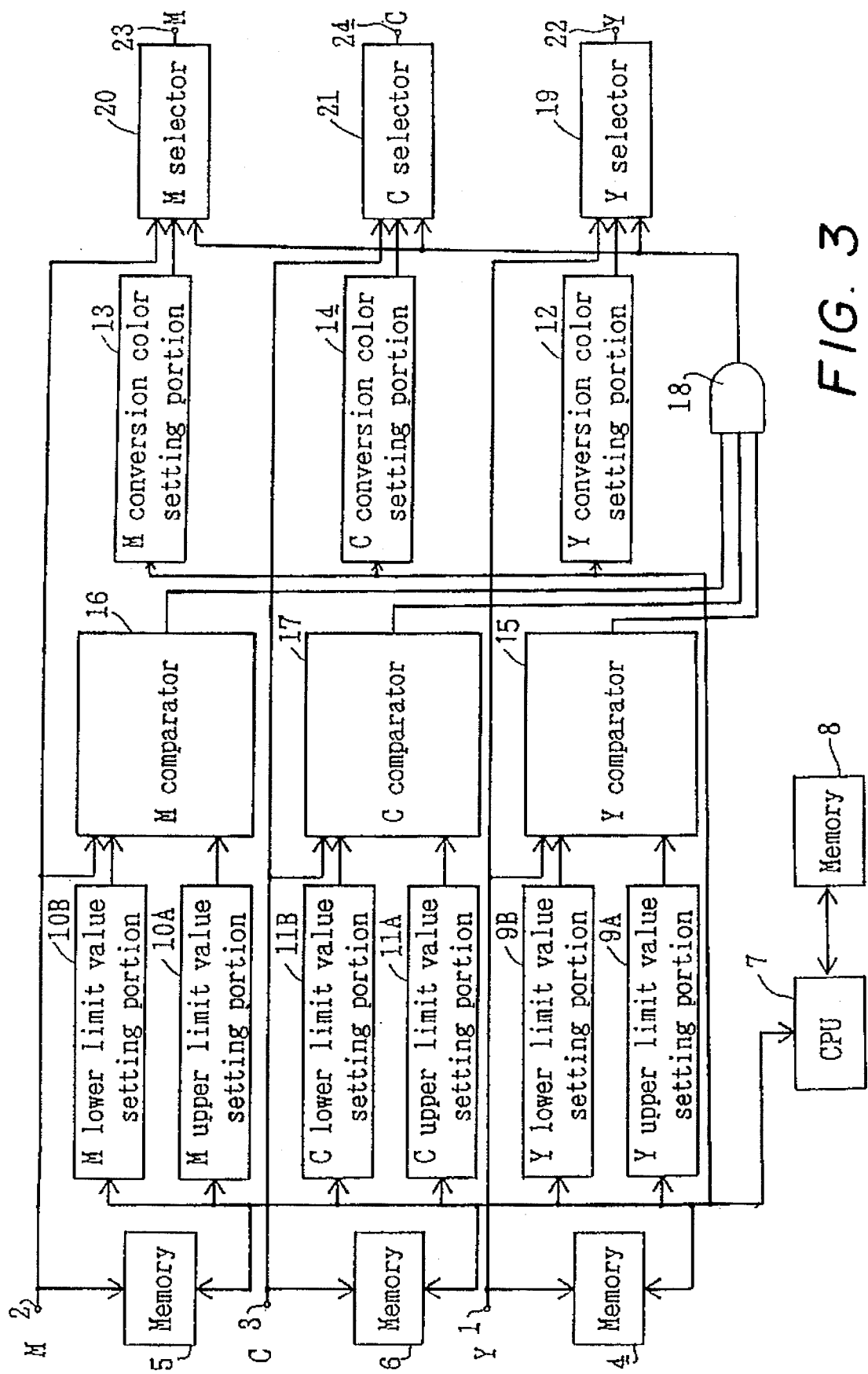
FIG. 3 is a block circuit diagram of a color converting circuit which is a first embodiment of the present invention.

FIG. 3 is a block diagram showing a first embodiment of the above-described color converting circuit 31. Numerals 1, 2 and 3 represent yellow (Y), magenta (M) and cyan (C)input terminals, respectively, to which yellow, magenta and cyan color image data (digital data) read out by a color scanner from a color original to be copied are respectively inputted in the 8-bit form (256 gradations), that is, to which red, green and blue (three primary colors of light) color image data read out by the color scanner are inputted after having been converted to yellow, magenta and cyan color image data representative of toner density. Numerals 4, 5 and 6 represent Y, M and C memories, respectively, for storing yellow, magenta and cyan color image data of a color-to-be-converted which data are read out at the time of pre-scanning performed before copy scanning and inputted to the Y, M and C input terminals 1, 2 and 3, respectively. Numeral 7 represents a microcomputer (hereinafter referred to as CPU) which controls image processing executed at an image processing portion. The CPU 7 calculates the average value of the yellow, magenta and cyan color image data of the color-to-be-converted which data are stored in the Y, M and C memories 4, 5 and 6, and thereafter sets an upper limit value and a lower limit value of the conversion range of the color-to-be-converted by respectively adding and subtracting a predetermined set value to and from each of the calculated average values of yellow, magenta and cyan data. At this time, the CPU 7 determines whether or not each of the lower limit values obtained by subtraction is below a lower limit restriction value, and when the lower limit value is below the restriction value, it sets the lower limit restriction value as the lower limit value of the conversion range to subsequently-described Y, M and C upper and lower limit value setting portions. Specifically, the color-to-be-converted is read out at the time of pre-scanning by the users specifying a point on a portion of an arbitrary color on a color original by specifying a point on a tablet. For example, yellow, magenta and cyan color image data are read out for a 1 mm square on the original with a pointer on the color specified as the color-to-be-converted at the time of the pre-scanning (if 16 dots/mm, yellow, magenta and cyan data for 256 dots are read out), and are stored in the Y, M and C memories 4, 5 and 6, respectively (in this case, the capacity of each memory is 256 bytes). Then, average values A1, A2 and A3 of the stored yellow, magenta and cyan color image data of the color-to-be-converted are calculated by the following expressions:

$$A1 = \frac{\text{sum of } Y \text{ color image data for 256 dots}}{256}$$

$$A2 = \frac{\text{sum of } M \text{ color image data for 256 dots}}{256}$$

$$A3 = \frac{\text{sum of } C \text{ color image data for 256 dots}}{256}$$

For example, when the calculated average values of the magenta, cyan and yellow color image data of the color-to-be-converted which data are read out at the time of the prescanning have respective gradations of 35, 20 and 200 and a set value to be added to and subtracted from them is gradation 20 and the lower limit restriction values of the magenta, cyan and yellow color image data are respectively gradation 20, gradation 20 and gradation 20, the upper limit values of the conversion range obtained by the addition by the CPU 7 are gradation 55, gradation 40 and gradation 220, and the lower limit values obtained by the subtraction by the CPU 7 are gradation 15, gradation 0 and gradation 180. The calculated lower limit value of yellow (gradation 180) is set as the lower limit value of yellow of the conversion range since it is above the lower limit restriction value (gradation 20), whereas as the lower limit values of magenta and cyan of the conversion range, the lower limit restriction value (gradation 20) is set since the calculated lower limit values of magenta and cyan (gradation 15 and gradation 0) are below the lower limit restriction value (gradation 20). The lower limit restriction value is preset to a value (in this case, gradation 20) at which the color conversion is not performed with respect to the paper color of the original, for example, to a value close to the upper limit value of the density of the paper color.

Numeral 8 represents a memory (e.g. read only memory constituted by a semiconductor) in which a control program for the CPU 7 and the lower limit restriction value are stored. Numerals 9A to 11A and 9B to 1ib represent Y, M and C upper limit value setting portions and Y, M and C lower limit value setting portions (e.g. 8-bit input/output resistors), respectively, to which the upper and lower limit values of each of the yellow, magenta and cyan color image data of the conversion range are set by the CPU 7. Numerals 12, 13 and 14 represent Y, M and C conversion color setting portions, respectively, where yellow, magenta and cyan color image data of a conversion color desired by the user is set by the CPU 7. The setting of the data to the setting portions 9A, 9B, 10A, 10B, 11A and 11B and 12, 13 and 14 is performed between the pre-scanning and the copy scanning through control by the CPU 7. As the conversion color, a standard color which is preset in the copying machine, a registered color which is set by the user and a specified color which is an arbitrary color on a color original specified by the user are provided. The conversion color is stored, for example, in a non-illustrated memory for conversion color. Numerals 15, 16 and 17 represent Y, M and C comparators, respectively, which compare the yellow, magenta and cyan color image data read out at the time of the copy scanning performed after the prescanning with the upper and lower limit values set to the upper and lower limit value setting portions 9A, 9B, 10A, 10B, 11A and 11B. The comparators 15, 16 and 17 output high-level control signals when the color image data inputted to the Y, M and C input terminals 1, 2 and 3 are within a conversion range defined by the upper and lower limit values, that is, color image data fulfill the following conditions: [Y lower limit value]≦[Y color image data]≦[Y upper limit value]; [M lower limit value]≦[M color image data]≦[M upper limit value]; and [C lower limit value]≦[C color image data]≦[C upper limit value], respectively. The output signals thereof are applied to subsequently-described Y, M and C selectors through an AND circuit 18. Numerals 19, 20 and 21 represent Y, M and C selectors, respectively, which selectively output either the color image data inputted to the Y, M and C input terminals 1, 2 and 3 or the color image data set to the Y, M and C conversion color setting portions 12, 13 and 14 according to the output signal of the AND circuit 18. The selectors 19, 20 and 21 output to Y, M and C output terminals 22, 23 and 24 the color image data from the Y, M and C conversion color setting portions 12, 13 and 14 instead of the color image data from the Y, M and C input terminals 1, 2 and 3 only when the high-level control signals are inputted from the AND circuit 18. The color image data outputted from the output terminals 22, 23 and 24 are supplied to a succeeding laser scanner unit after signal processing such as generation of black color image data and data correction is executed.

When the user operates a copy button after selecting a color conversion mode and specifying a color-to-be-converted on a color original and a conversion color, first, the pre-scanning is performed. Then, after the reading out the yellow, magenta and cyan color image data of the specified color-to-be-converted and the calculation of the average value of each color image data are performed by the Y, M and C memories 4, 5 and 6 and the CPU 7, respectively, the upper and lower limit values of the conversion range are calculated from the calculated average values and are set to the Y, M and C upper and lower limit value setting portions 9A, 9B, 10A, 10B, 11A and 11B, respectively, and yellow, magenta and cyan color image data of the conversion color are set to the Y, M and C conversion color setting portions 12, 13 and 14. Then, at the time of the copying scanning performed after the pre-scanning, the comparison detection of the color image data of the color-to-be-converted by the Y, M and C comparators 15, 16 and 17 and the selective output by the Y, M and C selectors 19, 20 and 21 are performed. At this time, if the color image data inputted to the Y, M and C input terminals 1, 2 and 3 are all within the conversion range, such data are converted to the color image data of the conversion color and outputted.

The above-described embodiment premises that the color conversion is not performed with respect to the paper color of the color original. In order that color conversion of the paper color of the color original is performed as well, whether the color-to-be-converted is a chromatic color or an achromatic color is determined by the CPU 7, and only when the color-to-be-converted is a chromatic color, whether or not the lower limit value which is obtained by subtraction is below a lower limit restriction value is determined. Specifically, after the average values of the yellow, magenta and cyan color image data of the color-to-be-converted which data are read out at the time of the pre-scanning and stored in the Y, M and C memories 4, 5 and 6 are calculated, the determination on whether the color-to-be-converted is a chromatic color or an achromatic color is made based on a result of the determination on whether or not the difference between the maximum and minimum values of the calculated average values of yellow, magenta and cyan is above a predetermined color determination value. When the color-to-be-converted is determined to be an achromatic color, the lower limit value obtained by subtraction is set as the lower limit value of the conversion range irrespective of whether or not it is below the lower limit restriction value. For example, when the color determination value is 25 and the average values of the magenta, cyan and yellow color image data in the region of the color-to-be-converted which data are read out at the time of the pre-scanning are gradation 35, gradation 20 and gradation 150, respectively, the difference between the maximum and minimum values of the average values calculated by the CPU 7 is [gradation 150 of yellow] −[gradation 20 of cyan]=130, and 130 >25 (color determination value). Accordingly, the color-to-be-converted is determined to be a chromatic color. Conversely, when the average values of the magenta, cyan and yellow color image data in the region of the color-to-be-converted are gradation 35, gradation 20 and gradation 25, respectively, the difference between the maximum and minimum values of the average values calculated by the CPU 7 is [gradation 35 of magenta][gradation 20 of cyan]=15, and 15 ≦25 (color determination value). Accordingly, the color-to-be-converted is determined to be an achromatic color. The color determination value as well as the lower limit restriction value is stored in the memory 8.

Figure 4:
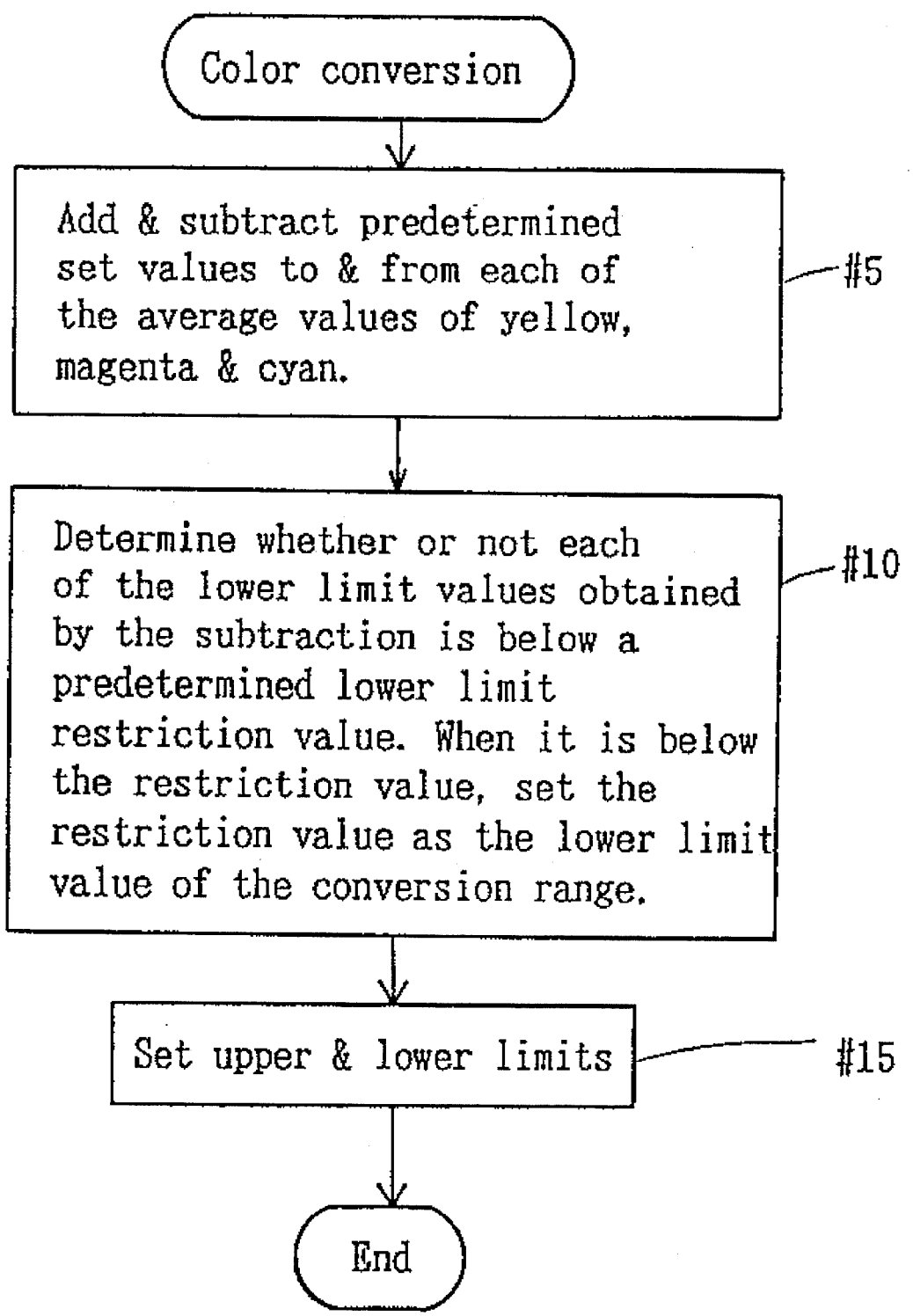
FIG. 4 is a flow chart of a color converting operation performed by the color converting circuit of FIG. 3.

Subsequently, control operations by the CPU 7 for setting the upper and lower limit values will be described with reference to the flow charts of FIGS. 4 and 5. FIG. 4 shows a flow chart of a case where the lower limit value which is obtained by subtraction can be restricted to the lower limit restriction value irrespective of whether the color-to-be-converted is a chromatic color or an achromatic color. First, at step #5, the pre-scanning in the color conversion mode is performed and the average values of the yellow, magenta and cyan color image data of the color-to-be-converted which data are stored in the Y, M and C memories 4, 5 and 6 are calculated. Then, a predetermined set value is added to and subtracted from each of the calculated average values of yellow, magenta and cyan to obtain the upper and lower limit values of the conversion range. Then, at step #10, it is determined whether or not the lower limit value obtained by subtraction is below the lower limit restriction value is determined. When it is below the lower limit restriction value, the lower limit restriction value is used as the lower limit value of the conversion range. When it is not below the lower limit restriction value, the obtained lower limit value is used as the lower limit value of the conversion range. Then, at step #15, the upper and lower limit values are set to the Y, M and C upper and lower limit value setting portions 9A, 9B, 10A, 10B, 11A and 11B, and the control operation is completed.

Figure 5:
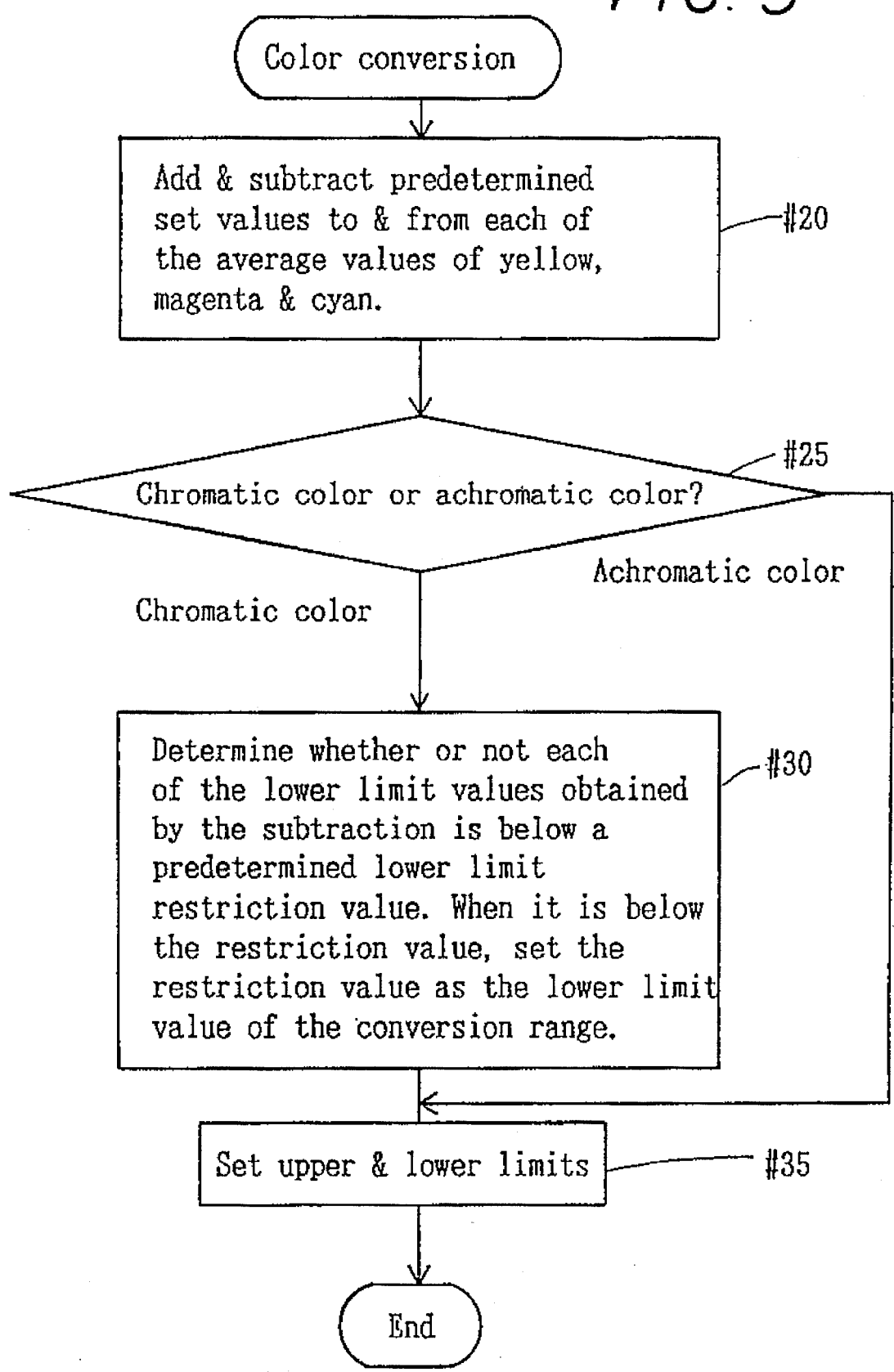
FIG. 5 is a flow chart of another color converting operation performed by the color converting circuit of FIG. 3.

FIG. 5 shows a flow chart of a case where the lower limit value can be restricted to the lower limit restriction value only when the color-to-be-converted is a chromatic color. First, at step #20, the pre-scanning in the color conversion mode is performed and the average values of the yellow, magenta and cyan color image data of the color-to-be-converted which data are stored in the Y, M and C memories 4, 5 and 6 are calculated. Then, a predetermined set value is added to and subtracted from each of the calculated average values of yellow, magenta and cyan to obtain the upper and lower limit values of the conversion range. Then, at step #25, whether or not the difference between the maximum and minimum values of the average values of yellow, magenta and cyan is above the color determination value is determined. When the difference is below the color determination value, that is, when the color-to-be-converted is determined to be an achromatic color, the process proceeds to step #35, where the upper and lower limit values obtained by addition and subtraction are set to the Y, M and C upper and lower limit value setting portions 9A, 9B, 10A, 10B, 11A and 11B, and the control operation is completed. Conversely, when the difference is above the color determination value, that is, when the color-to-be-converted is determined to be a chromatic color, the process proceeds to step #30, where whether or not the lower limit value obtained by subtraction is below the lower limit restriction value is determined. When it is below the lower limit restriction value, the lower limit restriction value is used as the lower limit value of the conversion range. When it is not below the lower limit restriction value, the lower limit value obtained by subtraction is used as the lower limit value of the conversion range. Then, the process proceeds to step #35, where the upper and lower limit values are set to the Y, M and C upper and lower limit value setting portions 9A, 9B, 10A, 10B, 11A and 11B, and the control operation is completed.

Figure 10:
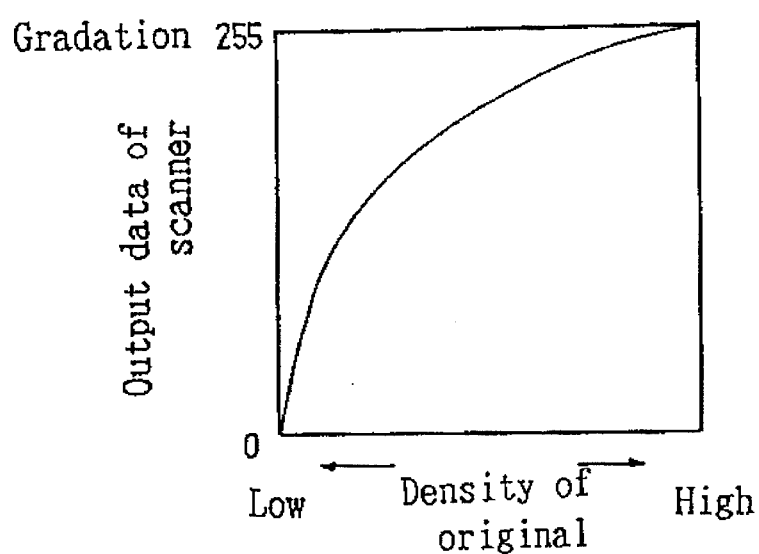
FIG. 10 is a characteristic view showing an output of a scanner with respect to a density of an original.

While in the above-described embodiment, the set value to be added to and subtracted from the average value of each color image data obtained at the time of the pre-scanning is gradation 20 with respect to all the color image data, preferably, the set value is varied according to the density of the color-to-be-converted on the original. This is because, since the output of the color scanner which reads out density variation of the image on the original from a low density to a high density shows not a linear characteristic but a characteristic where nonuniformity of the reading out is large in a low density region and small in a high density region as shown in FIG. 10, it is necessary to set a conversion range which is in accordance with the density characteristic. Table 1 shows examples of set values for the addition and subtraction which values are set in accordance with the density of each color image data with such an intention. The data shown in Table 1 are stored in the memory 8 as a data table. Setting of the conversion range of the color image data where the data table is used will be described.

When the calculated average values of the magenta, cyan and yellow color image data in the region of the color-to-be-converted which data are read out at the time of the prescanning are respectively gradation 35, gradation 20 and gradation 200, the set values to be added to and subtracted from the average value of magenta is obtained in the following manner: since the average value of magenta (gradation 35) is within a gradation range between 25 and 50 shown in Table 1 (i.e. 25< the average value ≦50), the set value to be added is +30 and the set value to be subtracted is −10. Similarly, since 0≦ the average value of cyan (gradation 20)≦30, the set value to be added to the average value of cyan is +20 and the set value to be subtracted therefrom is −10, and the set value to be added to the average value of yellow (gradation 200) is +10 and the set value to be subtracted therefrom is −10. Hence, the upper and lower limit values obtained by the addition and subtraction by the CPU 7 are, in the order of values for magenta, cyan and yellow, gradation 65, gradation 40 and gradation 210 (the upper values); and gradation 25, gradation 10 and gradation 190 (the lower values). When the lower limit restriction values of each color image data are set to values at which the color conversion is not performed with respect to the paper color of the original, for example, to gradation 20, gradation 20, gradation 20, the calculated lower limit values of magenta and yellow (gradation 25 and gradation 190) are set as the lower limit values of magenta and yellow of the conversion range since they are above the lower limit restriction value (gradation 20), whereas since the calculated lower limit value of cyan (gradation 10) is below the lower limit restriction value (gradation 20), the lower limit restriction value (gradation 20) is set as the lower limit of cyan of the conversion range.

While in the above-described first embodiment, a case where the lower limit value of the conversion range is restricted was explained, the upper limit of the conversion range may be restricted in a similar manner if necessary. For example, when the calculated upper limit value exceeds gradation 255, it is preferable to restrain the upper limit value to gradation 255.

Figure 6:
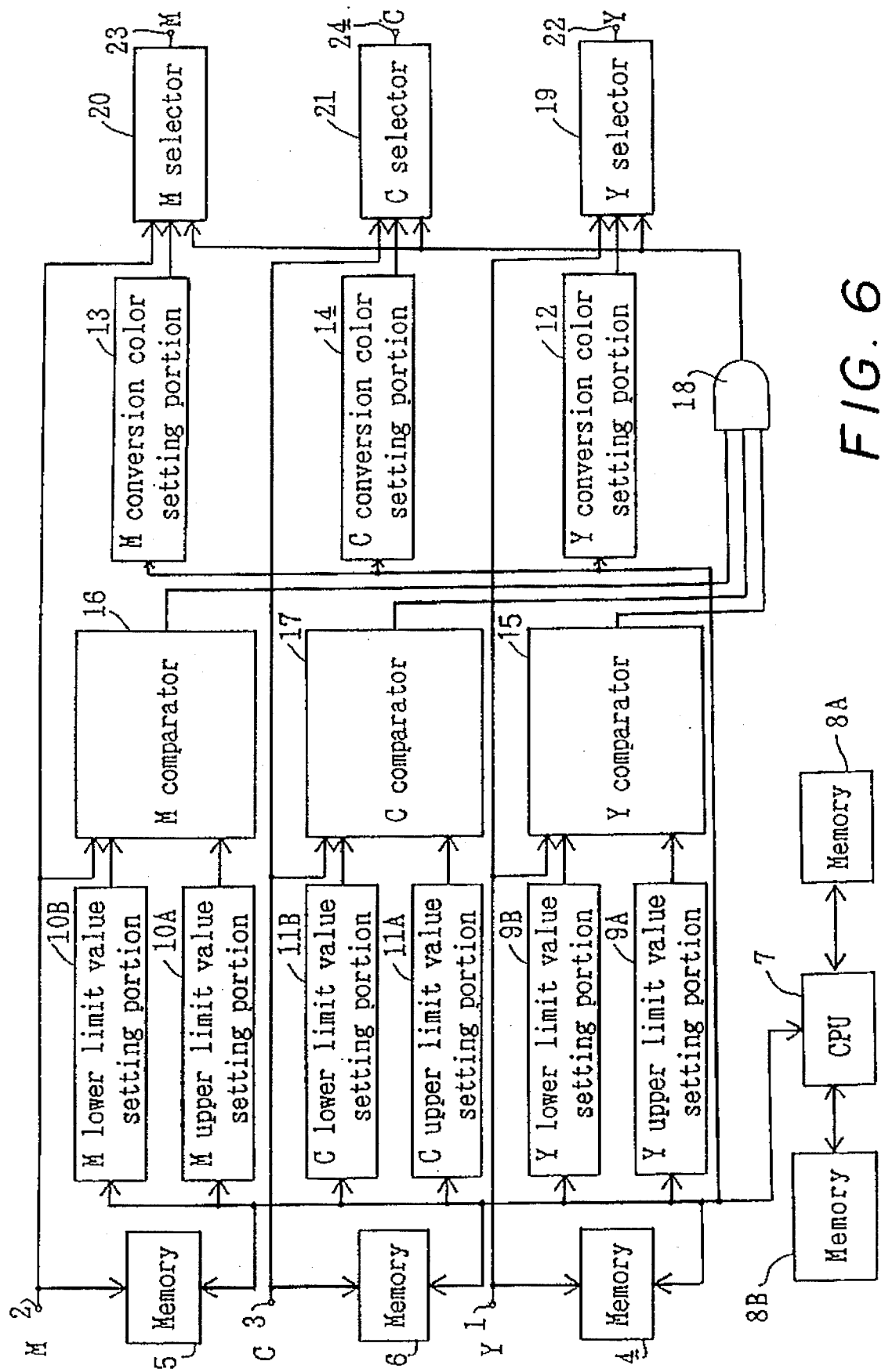
FIG. 6 is a block circuit diagram of a color converting circuit which is a second embodiment of the present invention.

FIG. 6 shows a second embodiment of the present invention. In a color converting circuit of the second embodiment, in setting the conversion range of the color image data, a conversion range is set which is in accordance with an image quality mode such as a letter mode and a photograph mode. A memory 8A connected to the CPU 7 has a control program and data (table data) shown in Tables 2 and 3. The memory 8A is a read only memory (ROM). A memory 8B, which is a random access memory (RAM), is used for the calculation operations by the CPU 7 at the time of the calculation of the average value of each of the color image data and the calculation of the upper and lower limit values. The arrangement of the other portions is the same as that of the embodiment of FIG. 3. Table 2 shows set values to be added to and subtracted from the average values in the letter mode. Table 3 shows set values to be added to and subtracted from the average values in the photograph mode.

The set values for the addition and subtraction are stored in the memory 8B as data tables, in this case, as a data table for the letter mode and a data table for the photograph mode. A required set value is read out from a data table corresponding to the mode by using the calculated average values of the magenta, cyan and yellow data as addresses.

In the letter mode, when the calculated average values of the magenta, cyan and yellow color image data in the region of the color-to-be-converted which data are read out at the time of the pre-scanning are respectively gradation 200, gradation 50 and gradation 200, the set values to be added to and subtracted from the average value of magenta is obtained in the following manner: since the average value of magenta (gradation 200) is within a gradation range between 171 and 210 shown in Table 2 (i.e. 171< the average value ≦210), the set value to be added is +25 and the set value to be subtracted is −30. Similarly, since 31≦ the average value of cyan (gradation 50) ≦55, the set value to be added to the average value of cyan is +40 and the set value to be subtracted therefrom is −20, and the set value to be added to the average value of yellow (gradation 200) is +20 and the set value to be subtracted therefrom is −30. Hence, the upper and lower limit values obtained by the addition and subtraction by the CPU 7 are, in the order of values for magenta, cyan and yellow, gradation 225, gradation 90 and gradation 220 (the upper values) and gradation 170, gradation 30 and gradation 170 (the lower values).

In the photograph mode, when the calculated average values of the magenta, cyan and yellow color image data in the region of the color-to-be-converted which data are read out at the time of the pre-scanning are respectively gradation 200, gradation 50 and gradation 200, the set values to be added to and subtracted from the average value of magenta is obtained in the following manner: since the average value of magenta (gradation 200) is within a gradation range between 171 and 210 shown in Table 3 (i.e. 171 < the average value ≦210), the set value to be added is +15 and the set value to be subtracted is −15. Similarly, since 31≦ the average value of cyan (gradation 50) ≦55, the set value to be added to the average value of cyan is +30 and the set value to be subtracted therefrom is −10, and the set value to be added to the average value of yellow (gradation 200) is +10 and the set value to be subtracted therefrom is −10. Hence, the upper and lower limit values obtained by the addition and subtraction by the CPU 7 are, in the order of values for magenta, cyan and yellow, gradation 215, gradation 80 and gradation 210 (the upper values) and gradation 185, gradation 40 and gradation 190 (the lower values). In the photograph mode in which an original having a large amount of half tone is copied, since there is a strong possibility that a color not intended by the user is also converted, the conversion range is set to be smaller than that in the letter mode in order to prevent erroneous conversion.

Figure 7:
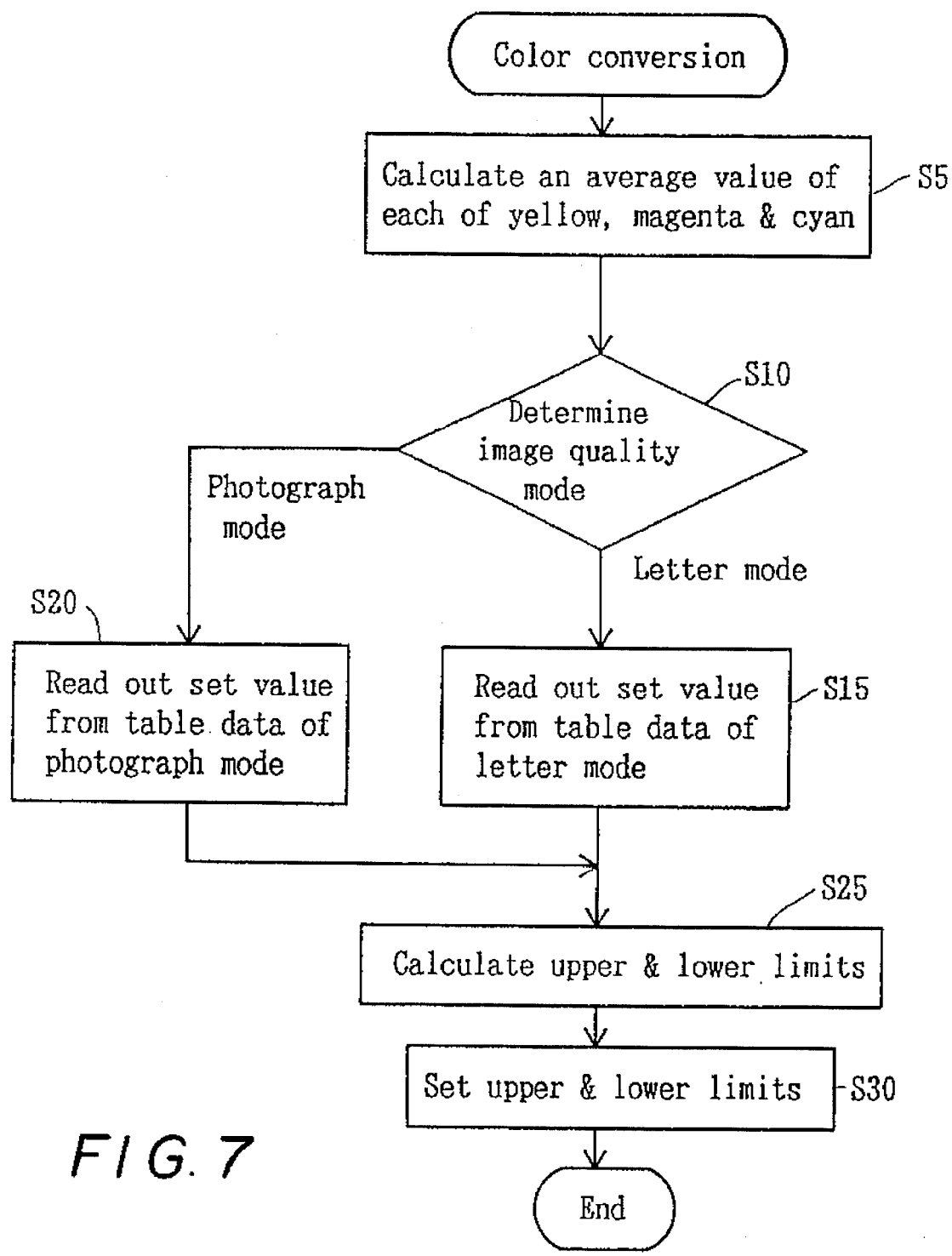
FIG. 7 is a flow chart of a color converting operation performed by the color converting circuit of FIG. 6.

Subsequently, a control operation by the CPU 7 for setting the upper and lower limit values will be described with reference to the flow chart of FIG. 7.

First, after the pre-scanning in the color conversion mode is performed, at step S5, the average value of each of the yellow, magenta and cyan color image data of the color-to-be-converted which data are stored in the Y, M and C memories 4, 5 and 6 is calculated. Then, at step S10, whether the image quality mode is the letter mode or the photograph mode is determined. When the mode is determined to be the letter mode, the process proceeds to step S15, where set values to be added to and subtracted from the calculated average values of each of the yellow, magenta and cyan color image data are read out from the data table for the letter mode (Table 2). At the next step S25, the upper and lower limit values are obtained by the addition and subtraction. Then, at step S30, the obtained upper and lower limit values are set to the Y, M and C upper and lower limit values setting portions 9A, 9B, 10A, 10B, 11A and 11B, and the control operation is completed.

When the mode is determined to be the photograph mode at step S10, the process proceeds to step S20, where set values to be added to and subtracted from the calculated average value of the yellow, magenta and cyan color image data are read out from the data table for the photograph mode (Table 3). At the next step S25, the upper and lower limit values are obtained by the addition and subtraction. Then, at step S30, the obtained upper and lower limit values are set to the Y, M and C upper and lower limit values setting portions 9A, 9B, 10A, 10B, 11A and 11B, and the control operation is completed.

Since, as described above, the conversion range can be set which is in accordance with the image quality mode in the color converting circuit of the second embodiment of the present invention, when the color converting circuit is employed, for example, for a color electrophotographic copying machine, optimum color conversion can be realized irrespective of whether the image quality mode is the letter mode or the photograph mode.

In the second embodiment, it is also preferable to provide a lower limit restriction value similar to the first embodiment and set the lower limit restriction value as the lower limit value of the conversion range when a lower limit value obtained through the above-mentioned subtraction is below the lower limit restriction value. Similarly, when an upper limit value obtained through the above-mentioned addition is above a predetermined upper limit restriction value, the upper limit value may be restricted. Moreover, it is preferable to restrict the lower limit value only in the case of a chromatic color. The reason therefor has been described with respect to the first embodiment.

Figure 8:
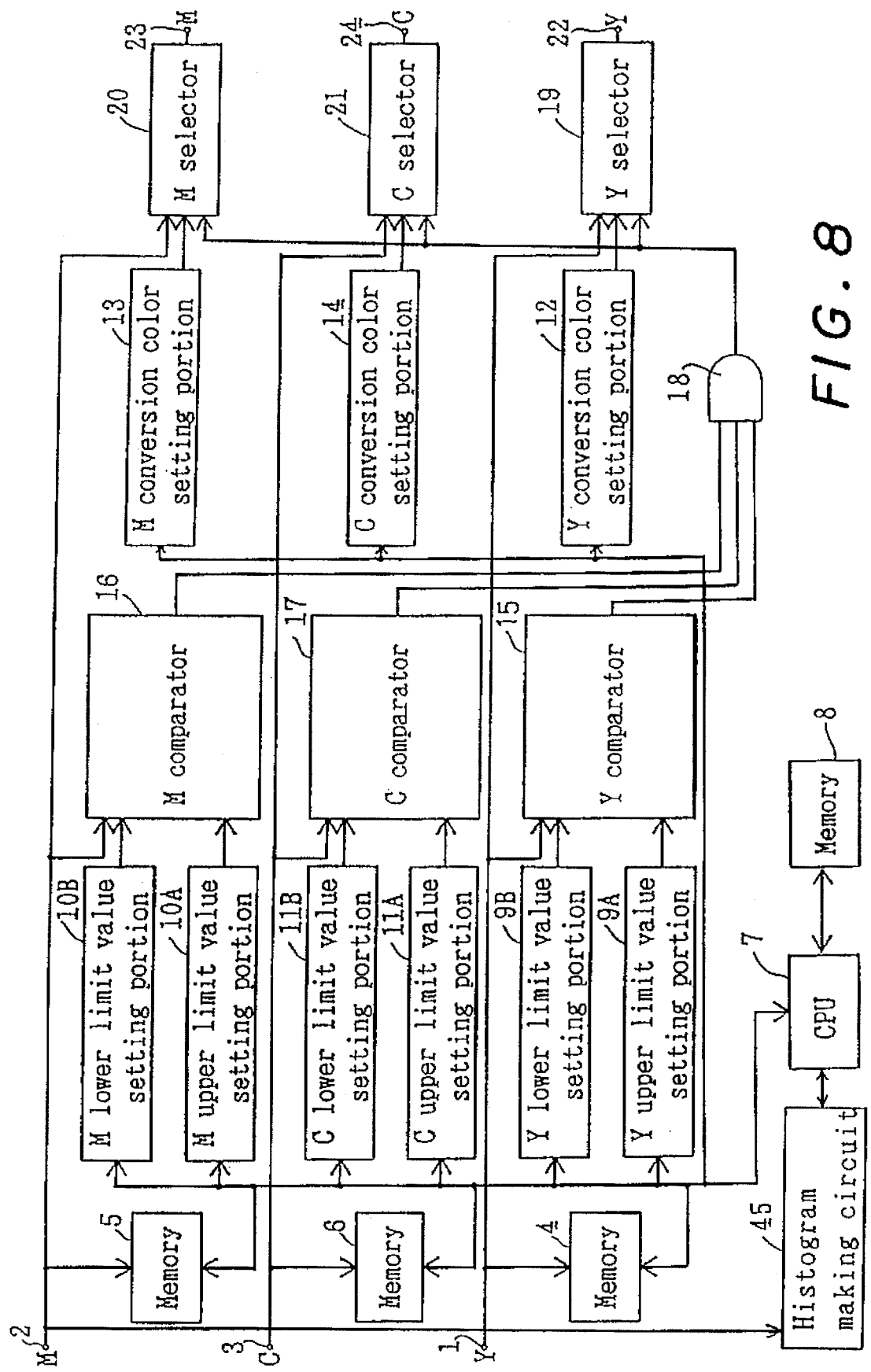
FIG. 8 is a block circuit diagram of a color converting circuit of a third embodiment of the present invention.
Figure 9:
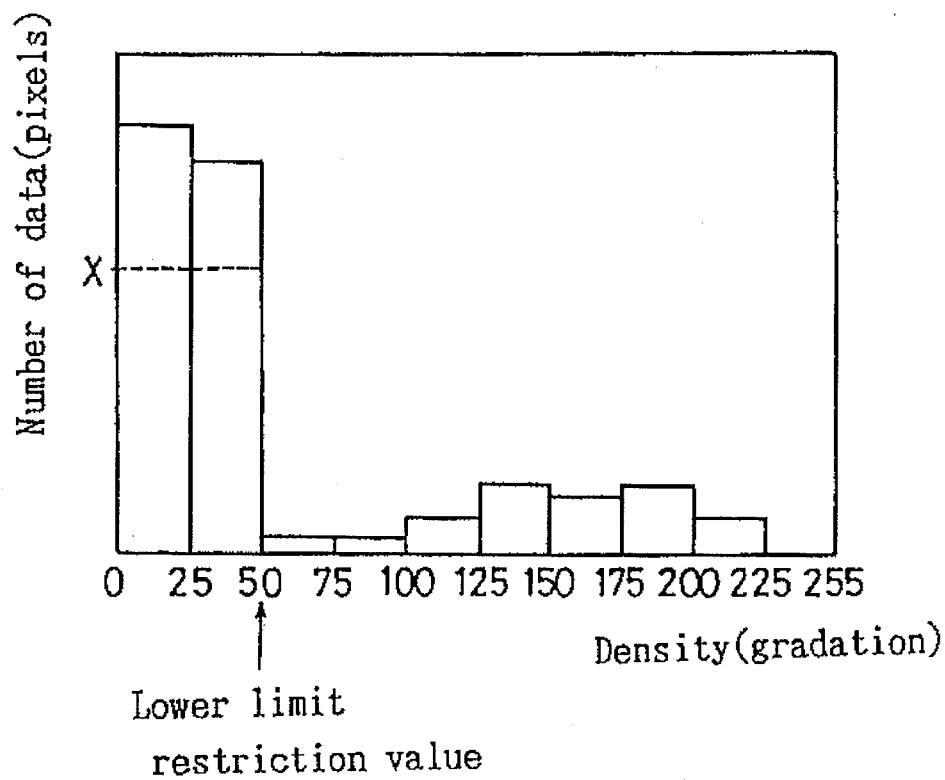
FIG. 9 is a view showing a histogram used in the third embodiment of the present invention.

FIG. 8 shows a third embodiment of the present invention. In this embodiment, the lower limit restriction value is set by use of a histogram (density distribution graph) in order to restrict so that the color conversion range does not include the paper color of the original. In FIG. 8, the input terminal 2 is connected to a histogram making circuit 45, and the histogram making circuit 45 is connected to the CPU 7. The arrangement of other portions is the same as that of FIG. 3. A histogram is made by the histogram making circuit 45 based on the magenta color image data which are read out at the time of pre-scanning and inputted to the input terminal 2, and determining that a portion whose number of data (number of pixels) exceeds a determination threshold value of the paper color is a paper color portion, the density (gradation) of the boundary of the paper color portion is read out by the CPU based on the histogram. The density read out is used as the lower limit restriction value. For example, when a histogram as shown in FIG. 9 where the gradation distribution between 0 to 255 gradations, of the magenta color image data of the entire original or a predetermined region of the original which image data are read out at the time of the pre-scanning and inputted is shown by bars each representing the number of data of every 25 gradations is obtained through control by the CPU, determining that a portion whose number of data is greater than the determination threshold value X of the paper color portion is a paper color portion, the density (in this case, gradation 50) of the boundary of the paper color portion is read out and used as the lower limit restriction value. In this case, there is a possibility that the number of data exceeds X at a portion where the gradation is high (e.g. at gradations 175 to 200) in the histogram, it is preferable to determine a portion where the number of data is larger than X as a background portion where no letters, figures, etc. are printed, for example, in a range of gradation less than 125. In the above example, only a histogram of magenta is used. This is because it is assumed that the paper color is white or grey. When the paper color is not white and grey but another color, a histogram of yellow or cyan should be used according to the color. It is possible to use a combination of histograms of a plurality of color image data. A control operation by the CPU 7 for setting the upper and lower limit values is performed in accordance with the flow chart of FIG. 4. First, at step #5, the pre-scanning in the color conversion mode is performed and the average values of the yellow, magenta and cyan color image data of the color-to-be-converted which data are stored in the Y, M and C memories 4, 5 and 6 are calculated. Then, a predetermined set value is added to and subtracted from each of the calculated average values of yellow, magenta and cyan to obtain the upper and lower limit values of the conversion range. Then, at step #10, whether or not the lower limit value obtained by subtraction is below the predetermined lower limit restriction value which is set based on the histogram is determined. When it is below the lower limit restriction value, the lower limit restriction value is used as the lower limit value of the conversion range. When it is not below the lower limit restriction value, the obtained lower limit value is used as the lower limit value of the conversion range. Then, at step #15, the upper and lower limit values are set to the Y, M and C upper and lower limit value setting portions 9A, 9B, 10A, 10B, 11A and 11B, and the control operation is completed. In the above-described third embodiment, a histogram may be used to restrain the upper limit of the conversion range.

Figure 11:
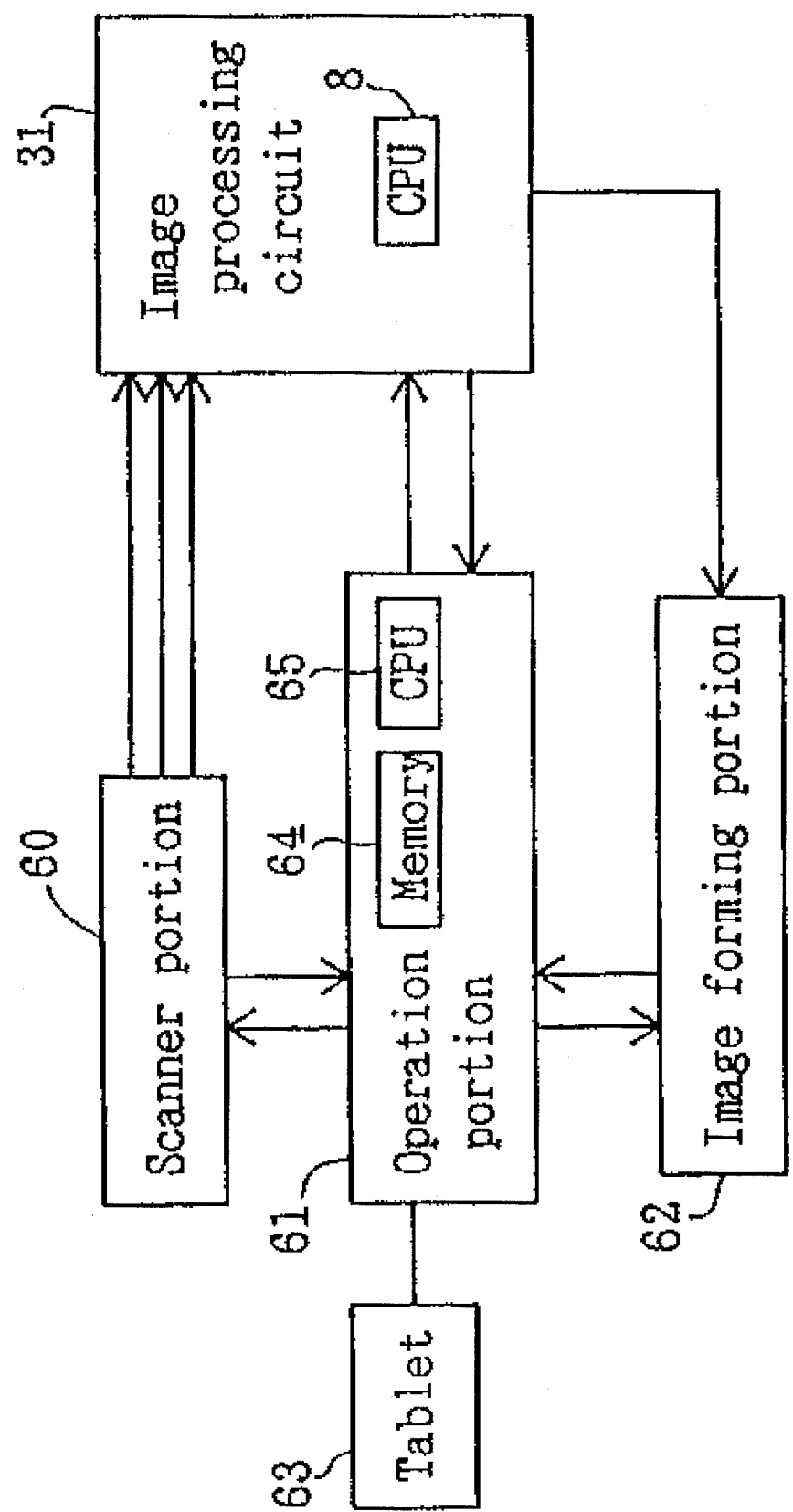
FIG. 11 is a block diagram schematically showing a general appearance of the copying machine of FIG. 1.

FIG. 11 is a simplified block diagram of the general arrangement of the copying machine shown in FIG. 1. Numeral 61 represents an operation portion which is provided with a CPU 65 and a memory 64 as well as various keys and a display portion 70 shown in FIG. 12. Numeral 60 represents a scanner portion which includes the scanning optical system 28, the condenser lens 29 and the color image signal generator 30 shown in FIG. 1. Numeral 31 represents the previously-described image processing circuit which processes color image data provided from the scanner portion 60. A CPU 8 of the image processing circuit 31 sends and receive signals to and from the CPU 65 of the operation portion 61. Numeral 62 represents an image forming portion for forming an image based on image data provided from the image processing circuit 31. The image forming portion 62 includes the photoreceptor drum 33 and the laser scanner unit 32 shown in FIG. 1.

Figure 12:
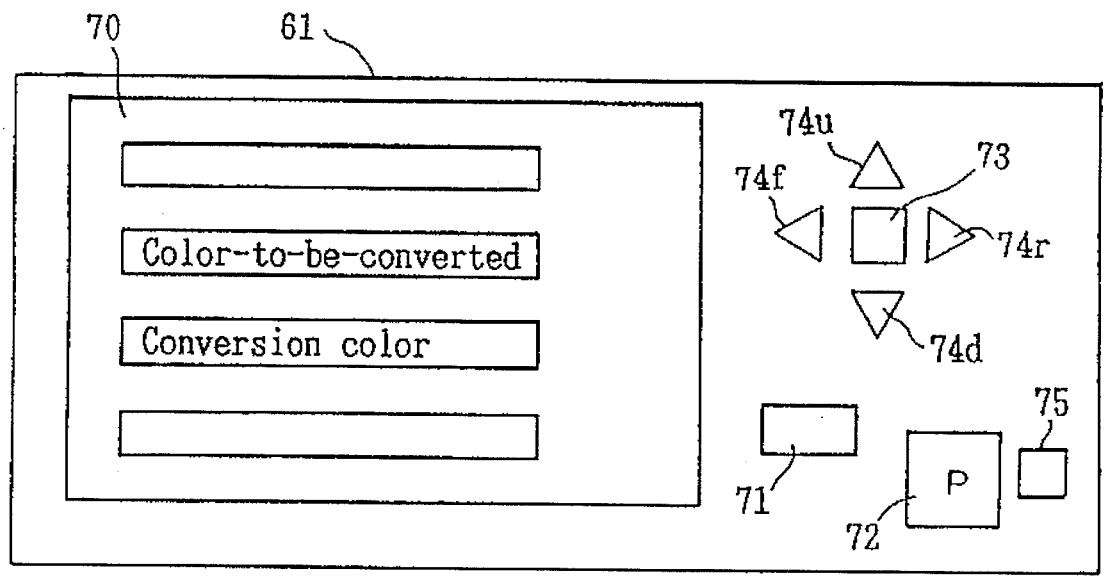
FIG. 12 shows an operation portion of the copying machine of FIG. 1.
Figure 13:
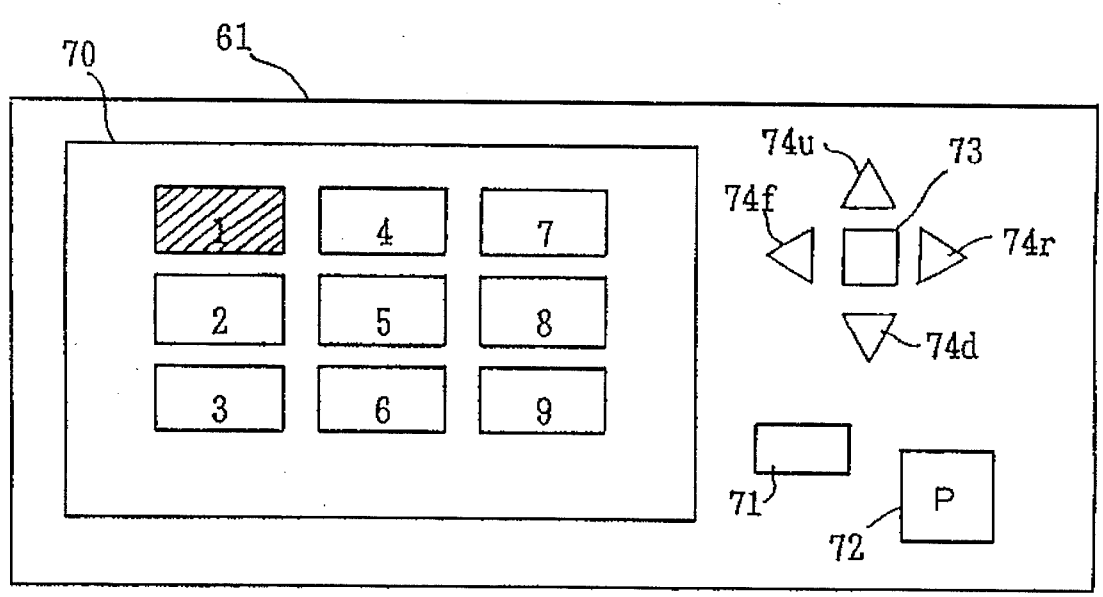
FIG. 13 is a view showing the operation portion of the copying machine of FIG. 1.
Figure 14:
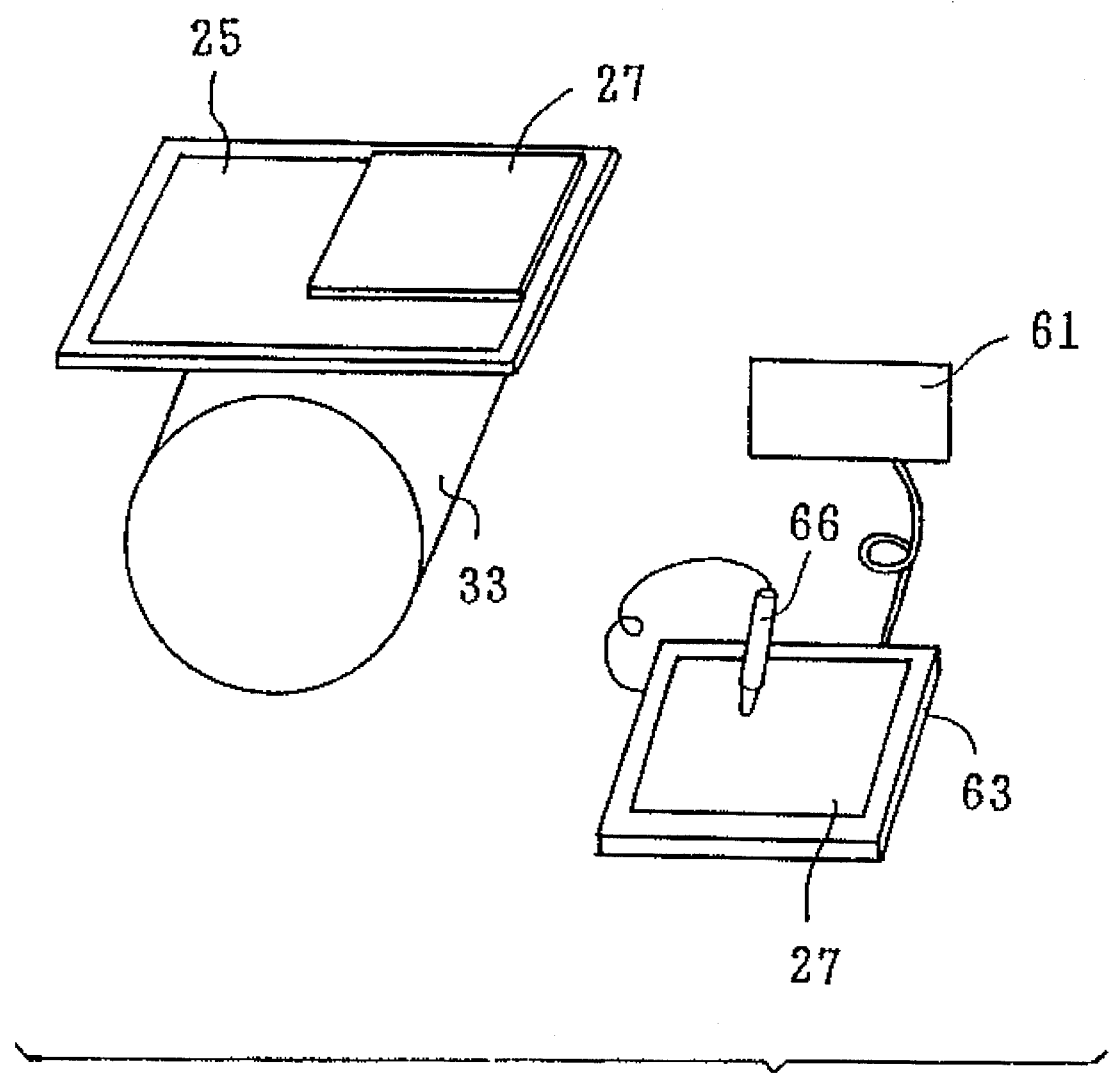
FIG. 14 is a view showing a relationship between a tablet and an original which is placed on a contact glass of the copying machine.

The operation portion 61 is provided with a color mode setting button 71 as shown in FIG. 12. When the button 71 is depressed, modes such as a color conversion mode and a color register mode are displayed at the display portion 70. By selecting the color conversion mode by operating a cursor by using up and down keys 74$u$ and 74$d$, and then depressing the enter key, the display portion 70 provides a display as shown in FIG. 12. When a color-to-be-converted specifying mode is selected among the items of the display by operating a cursor by using the up and down keys 74$u$ and 74$d$, and depressing the enter key, and a portion of a color-to-be-converted on the color original 27 placed on a tablet 63 shown in FIG. 14 is specified by a pen 66, the portion is stored in the memory 64. Then, the original 27 is moved from on the tablet 63 to on the contact glass 25. On the other hand, in FIG. 12, when a conversion color specifying mode is selected, numbers each corresponding to a pre-registered color are displayed at the display portion 70 as shown in FIG. 13, and a desired number (i.e. a desired color) is selected by operating a cursor by using the up and down keys 74u and 74d and right and left keys 74f and 74r and then depressing an enter key 73. The selected number (color) is stored in the memory 64. Then, by depressing a copy key 72, the previously-described color conversion operation is performed. At this time, the data stored in the memory 64 are transmitted to the CPU 8 of the image processing circuit 31. In FIG. 12, numeral 75 represents an image quality mode changeover key for selecting between the letter mode and the photograph mode. The data on the mode selection by this key is also stored in the memory 64, and is transmitted to the CPU 8 through the CPU 65 at the time of copying.

Obviously, many modifications and variations of the present invention are possible in light of the above teachings. It is therefore to be understood that within the scope of the appended claims, the invention may be practiced other than as specifically described.

TABLE 1

| Color | Range | | Set value | |
|---|---|---|---|---|
| | Lower limit | Upper limit | Subtraction | Addition |
| Magenta | 0 | 25 | −5 | +30 |
| | 25 | 50 | −10 | +30 |
| | 50 | 90 | −30 | +20 |
| | 90 | 130 | −20 | +20 |
| | 130 | 170 | −20 | +20 |
| | 170 | 210 | −15 | +15 |
| | 210 | 255 | −10 | +10 |
| Cyan | 0 | 30 | −10 | +20 |
| | 30 | 55 | −10 | +30 |
| | 55 | 100 | −20 | +30 |
| | 100 | 140 | −20 | +20 |
| | 140 | 180 | −20 | +15 |
| | 180 | 220 | −10 | +10 |
| | 220 | 255 | −10 | +5 |
| Yellow | 0 | 20 | −5 | +25 |
| | 20 | 40 | −5 | +30 |
| | 40 | 80 | −20 | +20 |
| | 80 | 120 | −15 | +20 |
| | 120 | 170 | −15 | +15 |
| | 170 | 210 | −10 | +10 |
| | 210 | 255 | −5 | +5 |

TABLE 2

| Color | Range | | Set value | |
|---|---|---|---|---|
| | Lower limit | Upper limit | Subtraction | Addition |
| Magenta | 0 | 25 | −10 | +45 |
| | 26 | 50 | −20 | +45 |
| | 51 | 90 | −40 | +30 |
| | 91 | 130 | −20 | +20 |
| | 131 | 170 | −20 | +20 |
| | 171 | 210 | −30 | +25 |
| | 211 | 255 | −30 | +20 |
| Cyan | 0 | 30 | −15 | +30 |
| | 31 | 55 | −20 | +40 |
| | 56 | 100 | −30 | +40 |

TABLE 2-continued

| Color | Range | | Set value | |
|---|---|---|---|---|
| | Lower limit | Upper limit | Subtraction | Addition |
| | 101 | 140 | −20 | +20 |
| | 141 | 180 | −20 | +15 |
| | 181 | 220 | −30 | +25 |
| | 221 | 255 | −30 | +20 |
| Yellow | 0 | 20 | −10 | +35 |
| | 21 | 40 | −15 | +45 |
| | 41 | 80 | −30 | +35 |
| | 81 | 120 | −15 | +20 |
| | 121 | 170 | −15 | +20 |
| | 171 | 210 | −30 | +20 |
| | 211 | 255 | −30 | +15 |

TABLE 3

| Color | Range | | Set value | |
|---|---|---|---|---|
| | Lower limit | Upper limit | Subtraction | Addition |
| Magenta | 0 | 25 | −5 | +30 |
| | 26 | 50 | −10 | +30 |
| | 51 | 90 | −30 | +20 |
| | 91 | 130 | −20 | +20 |
| | 131 | 170 | −20 | +20 |
| | 171 | 210 | −15 | +15 |
| | 211 | 255 | −10 | +10 |
| Cyan | 0 | 30 | −10 | +20 |
| | 31 | 55 | −10 | +30 |
| | 56 | 100 | −20 | +30 |
| | 101 | 140 | −20 | +20 |
| | 141 | 180 | −20 | +15 |
| | 181 | 220 | −10 | +10 |
| | 221 | 255 | −10 | +5 |
| Yellow | 0 | 20 | −5 | +25 |
| | 21 | 40 | −5 | +30 |
| | 41 | 80 | −20 | +20 |
| | 81 | 120 | −15 | +20 |
| | 121 | 170 | −15 | +15 |
| | 171 | 210 | −10 | +10 |
| | 211 | 255 | −5 | +5 |

What is claimed is:

1. A color converting circuit for use in an image forming apparatus, said circuit comprising:

specifying means for specifying a color-to-be converted on an original, conversion range setting means for determining a conversion range of a color-to-be-converted, said conversion range setting means setting a conversion range for image data input during pre-scanning of the original;

conversion color setting means for setting a conversion color;

discriminating means for discriminating whether input image data are present within said conversion range;

a selector for outputting one of the input image data and data associated with the conversion color set by the conversion color setting means according to a result of the discriminating means, said conversion range setting means including restricting means for restricting the conversion range, so that the conversion range does not exceed predetermined limits, a calculating means for calculating an average value of color image data for yellow, magenta and cyan corresponding to image data read out during pre-scanning, upper and lower limit value setting means for setting an upper limit value by adding a predetermined set value to the average values for the yellow, magenta and cyan color image data, and setting a lower limit value by subtracting a predetermined set value from the average values, and lower limit value restricting means for determining whether each of the lower limit values set by the upper and lower limit value setting means is below a predetermined lower limit restriction value and setting the predetermined lower limit restriction value to the lower limit value of the conversion range when the lower limit value set by the upper and lower limit setting means is less than the predetermined lower limit restriction value.

2. A color converting circuit according to claim 1, wherein said conversion range is set for each of yellow, magenta and cyan, and wherein said selector outputs data associated with the conversion color when the input image data are within one of the conversion ranges of yellow, magenta and cyan set by the conversion range setting means, and outputs the input image data when the input image data are not within at least one of the conversion ranges.

3. A color converting circuit according to claim 1, wherein said conversion range setting means further includes determining means for determining whether the color-to-be-converted is a chromatic color or an achromatic color, and wherein said lower limit value restricting means restricts the lower limit value of the conversion range so as not to be below a predetermined value when the color-to-be-converted is determined to be a chromatic color by the determining means.

4. A color converting circuit according to claim 3, wherein said determining means includes calculating means for calculating an average value for the yellow, magenta and cyan color image data of the color-to-be-converted, which image data are read out during pre-scanning, and wherein said color determining means for determining whether the color-to-be-converted is a chromatic color or an achromatic color makes a determination based on whether a difference between a maximum value and a minimum value of the average values of the yellow, magenta and cyan color image data is greater than a predetermined color determination value.

5. A color converting circuit for use in an image forming apparatus, comprising:

specifying means for specifying a color-to-be-converted on an original, conversion range setting means for determining a conversion range of a color-to-be-converted according to a density characteristic of input image data, said conversion range setting means setting a conversion range for image data input during pre-scanning of the original;

conversion color setting means for setting a conversion color;

discriminating means for discriminating whether image data input after the conversion range has been set are within said conversion range; and a selector for outputting one of the input image data and data associated with conversion color set by the conversion color setting means according to a result of the discriminating means, and wherein said conversion range setting means includes, a calculating means for calculating an average value of color image data for yellow, magenta and cyan corresponding to image data read out during pre-scanning, upper and lower limit value setting means for setting an upper limit value by adding a predetermined set value which is in accordance with a density characteristic of the color image data average values of the yellow, magenta and cyan color image data, and setting a lower limit value by subtracting a predetermined set value which is in accordance with the density characteristic of the average color image data values.

6. A color converting circuit according to claim 5, wherein said conversion range is set for the yellow, magenta and cyan color image data, and wherein said selector outputs the data associated with the conversion color when the input image data are within the conversion ranges set for the yellow, magenta and cyan color image data, and outputs the input image data when the input image data is not within at least one of the conversion ranges.

7. A color converting circuit according to claim 5, wherein said predetermined set values are stored in a semiconductor memory as a data table and are read out when said addition and subtraction are performed.

8. A color converting circuit according to claim 7, wherein said conversion range setting means further includes lower limit value restricting means for setting a predetermined lower limit restriction value as a lower limit value of the conversion range when the lower limit value which is set by the upper and lower limit setting means is below the predetermined lower limit restriction value.

9. A color converting circuit according to claim 8, wherein said conversion range setting means further includes determining means for determining whether the color-to-be-converted is a chromatic color or an achromatic color, and wherein said lower limit value restricting means restricts the lower limit value of the conversion range so as not to be below a predetermined value when the color-to-be-converted is determined to be a chromatic color.

10. A color converting circuit according to claim 9, wherein said determining means includes calculating means for calculating an average value for yellow, magenta and cyan color image data of the color-to-be-converted, which image data are read out during pre-scanning, and color determining means for determining whether the color-to-be-converted is a chromatic color or an achromatic color based on a result of a determination on whether a difference between a maximum value and a minimum value of any of the average values of the yellow, magenta and cyan color image data are above a predetermined color determination value.

11. A color converting circuit for use in an image forming apparatus, comprising:

image quality mode selecting means for selecting a selected image quality mode from between a letter image forming mode and a photograph image forming mode and setting the selected mode;

conversion range setting means for setting a conversion range representative of a color-to-be-converted based upon the image quality mode selected;

conversion color setting means for setting a conversion color;

discriminating means for discriminating whether image data input after the conversion range has been set are present within said conversion range; and a selector for outputting one of the input image data and data associated with the conversion color set by the conversion color setting means in response to a result of the discriminating means said conversion range setting means including calculating means for calculating an average value of color image data for yellow, magenta and cyan corresponding to image data read out during pre-scanning of an original, and upper and lower limit value setting means for setting an upper limit value by adding a predetermined set value which is in accordance with a density characteristic of the color image data average values of the yellow, magenta and cyan color image data and setting a lower limit value by subtracting a predetermined set value which is in accordance with the density characteristic of the average color image data values.

12. A color converting circuit according to claim 11, wherein said conversion range is set for yellow, magenta and cyan color image data, and wherein said selector outputs the data associated with the conversion color when the input image data are within the conversion ranges for the yellow, magenta and cyan color image data, and outputs the input image data when the input image data are not within at least one of the conversion ranges.

13. A color converting circuit according to claim 11, wherein said image forming apparatus is an electrophotographic copying machine and includes specifying means for specifying a color-to-be-converted on an original, and wherein said conversion range setting means sets a conversion range for image data input during pre-scanning of an original.

14. A color converting circuit according to claim 11, wherein said predetermined set values are stored in a semiconductor memory as a data table and are read out when said addition and subtraction are performed.

15. A color converting circuit according to claim 14, wherein said conversion range setting means further includes lower limit value restricting means for setting a predetermined lower limit restriction value as a lower limit value of the conversion range when the lower limit value which is set by the upper and lower limit setting means is below the predetermined lower limit value restriction value.

16. A color converting circuit according to claim 15, wherein said conversion range setting means further includes determining means for determining whether the color-to-be-converted is a chromatic color or an achromatic color, and wherein said lower limit value restricting means restricts the lower limit value of the conversion range so as not to be below a predetermined value when the color-to-be-converted is determined to be a chromatic color.

17. A color converting circuit according to claim 16, wherein said determining means includes calculating means for calculating an average value of each of yellow, magenta and cyan color image data of the color-to-be-converted which image data are read out during pre-scanning, and color determining means for determining whether the color-to-be-converted is a chromatic color or an achromatic color based on a result of a determination on whether or not a difference between a maximum value and a minimum value of any of the average values of the yellow, magenta and cyan color image data are above a predetermined color determination value.

18. A color converting circuit for use in an image forming apparatus, comprising:

conversion range setting means for determining a conversion range of a color-to-be-converted;

conversion color setting means for setting a conversion color;

discriminating means for discriminating whether input image data are present within said conversion range; and a selection for outputting one of the input image data and data associated with the conversion color set by the conversion color setting means in response to a result of the discriminating means, wherein said conversion range setting means includes histogram making for making a histogram from the input image data and restricting means for restricting the conversion range, so that the lower limit value of the conversion range is not less than or equal to a predetermined value which is based on the histogram calculating means for calculating an average value of color image data for yellowing, magenta and cyan corresponding to image data read out during pre-scanning, and upper and lower limit value setting means for setting an upper limit value by adding a predetermined set value to the average value of each of the yellow, magenta and cyan color image data and setting lower limit values by subtracting a predetermined set value from the average values, and lower limit value restricting means for determining whether or not each of the lower limit values which are set by the upper and lower limit value setting means by the subtraction is below a predetermined lower limit restriction value set based on the histogram, and setting the predetermined lower limit restriction value to the lower limit value of the conversion range when the lower limit value set by the upper and lower limit value setting means is less than the predetermined lower limit restriction value.

19. A color converting circuit according to claim 18, wherein said conversion range is set for yellow, magenta and cyan color image data, and wherein said selector outputs the data associated with the conversion color when the input image data are within the conversion ranges of yellow, magenta and cyan, and outputs the input image data when the input image data do not satisfy at least one of the conversion ranges.

20. A color converting circuit according to claim 19, wherein said image forming apparatus is an electrophotographic copying machine and includes specifying means for specifying a color-to-be-converted on an original, and wherein said conversion range setting means sets a conversion range for image data input during pre-scanning of the original.

21. A color converting circuit according to claim 20, wherein said histogram making means makes a histogram based on one of the yellow, magenta and cyan color image data which are read out during pre-scanning.

* * * * *